July 3, 1934.　　　E. J. W. RAGSDALE　　　1,965,258
SHEET METAL AIRCRAFT CONSTRUCTION
Filed June 26, 1931.
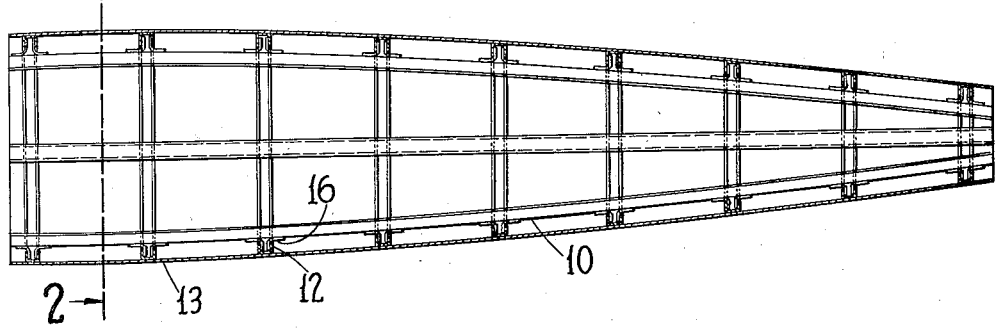
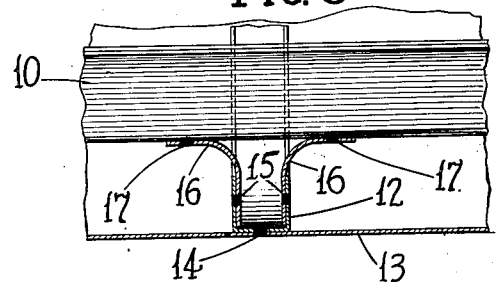
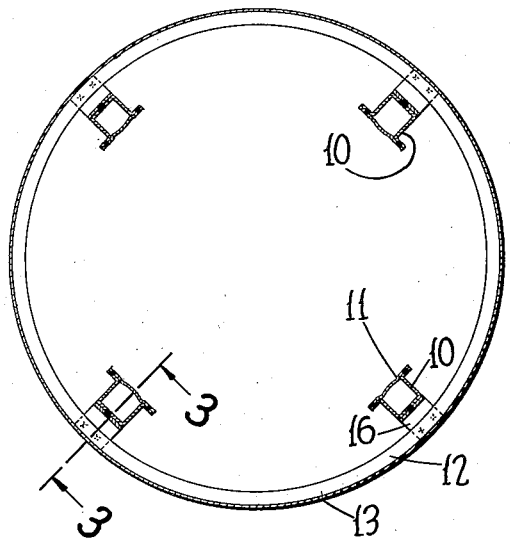
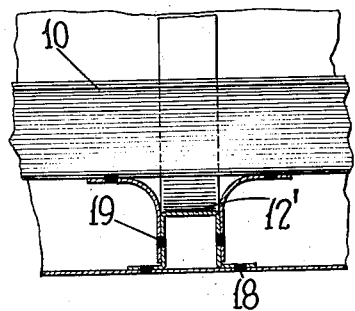
INVENTOR.
EARL J. W. RAGSDALE
BY John P. Tarbox
ATTORNEY.

Patented July 3, 1934

1,965,258

UNITED STATES PATENT OFFICE 1,965,258

SHEET METAL AIRCRAFT CONSTRUCTION

Earl J. W. Ragsdale, Norristown, Pa., assignor to Edward G. Budd Manufacturing Company, Philadelphia, Pa., a corporation of Pennsylvania Application June 26, 1931, Serial No. 546,956

5 Claims. (Cl. 244—30)

My invention relates to the art of aircraft and more particularly to the construction of airplane body parts of sheet metal. It has been my particular object to form a strong and inexpensive monocoque airplane fuselage of relatively light gauge sheet metal parts integrally connected by a plurality of welded joints. More particularly I have sought to provide a simple and secure construction embodying a metal framework and an exteriorly applied metal skin which may be assembled with facility without danger of wrinkling the skin or imposing undue stresses upon any of the parts incident to the assembly operation. While I have illustrated the application of my invention to a fuselage construction, it will be understood that it has other applications as well and I do not therefore wish to be limited to such application.

The manner in which I have achieved these objects will be obvious from a reading of the subjoined specification in the light of the attached drawing, in which, Fig. 1 is a central longitudinal section of my airplane fuselage construction.

Fig. 2 is a transverse section on the line 2—2 of Fig. 1.

Fig. 3 is a detail longitudinal section on the line 3—3 of Fig. 2, parts being shown in elevation for the sake of clearness, and Fig. 4 is a view similar to Fig. 3 illustrating a slight modification.

Referring to the drawing by reference characters, the numeral 10 indicates the internal longitudinal bracing system of my framework comprising a plurality of arcuately spaced longérons about which the remaining portion of my improved body construction is assembled in accordance with the preferred embodiment of my invention. These longérons consist of a main body portion of channel section reinforced by plates 11 extending longitudinally thereof and secured to the open side of the channel section by spot welding to form a closed box section, thus giving to this longitudinal bracing system the strength necessary in such constructions without the necessity of employing heavy gauge metal.

The outer portion of the body construction consists of a skin 13 reinforced by a plurality of channel shaped rings 12 secured to the skin by a plurality of annularly spaced spot welds 14 through the bases of the channel section rings. The composite skin member consisting of the skin proper 13 and the transverse bracing system 12 is secured to the system of longérons 10 by means of a plurality of gusset plates 15 secured within the channel section of the rings 12 upon opposite sides thereof and having arms 16 extending into parallel abutting contact with the longérons and spot welded thereto as indicated at 17.

It will thus be seen that through the medium of the gussets 15 the skin member is flexibly secured to the longitudinal bracing system. By the use of these flexible gusset plates I am enabled to attain both of the objects of my invention; thus the flexibility of these plates takes care of slight irregularities in the shapes of the assembled members and permits them to be assembled and united without wrinkling the skin or producing any undue stresses therein incident to the force applied to the parts during the assembly operation.

In Fig. 4 I have illustrated a slight modification of my invention. According to this modification I have formed flanges upon the legs of the channel section rings 12' constituting my transverse bracing system as indicated at 18 and secured these legs to the skin by spot welds. In this form I secure the flexible gussets which interconnect the longitudinal bracing system with the transverse bracing system to the outer sides of the walls of the channel section rings 12', as indicated at 19. In other respects this form of my invention is identical with that previously described.

Modifications will be obvious to those skilled in the art and I do not therefore wish to be limited except by the scope of my sub-joined claims as interpreted in the light of the generic spirit of my invention.

What I claim is:

1. An aircraft construction including, in combination, a framework consisting of longitudinally extending frame members, channel-shaped rings surrounding said framework, a skin permanently secured to rings, and flexible gussets permanently secured to the rings and framework and interconnecting the same.

2. An aircraft construction including, in combination, a framework consisting of longitudinally extending frame members, channel-shaped rings surrounding said framework, a skin permanently secured to said rings and flexible gussets permanently secured to said framework and to the inner walls of said channel-shaped rings.

3. An aircraft construction including, in combination, a framework consisting of longitudinally extending frame members, channel-shaped rings surrounding said framework, a skin permanently secured to said rings and flexible gussets permanently secured to said framework and to the outer walls of said channel-shaped rings.

4. An aircraft construction including in combination a framework comprising longitudinally extending frame members and transverse channel-shaped frame members surrounding said longitudinal frame members and spaced outwardly therefrom, flexible gussets interconnecting said longitudinal and transverse frame members permanently secured to each of said members and a skin covering said framework secured to said transverse members.

5. An aircraft construction including in combination a framework comprising longitudinally extending frame members and transverse members, said transverse members being channel-shaped in cross section and extending continuously around said longitudinal members and spaced outwardly therefrom, flexible metallic gussets interconnecting said longitudinal and transverse members and permanently secured to each of said members and a skin covering said framework secured to said transverse members.

EARL J. W. RAGSDALE.